(12) United States Patent
Schlipf et al.

(10) Patent No.: US 11,971,029 B2
(45) Date of Patent: Apr. 30, 2024

(54) TEST FRAME AND METHODS FOR FLUIDLY TESTING AGRICULTURAL DEVICES

(71) Applicant: Precision Planting LLC, Tremont, IL (US)

(72) Inventors: Ben L. Schlipf, Tremont, IL (US); Matthew Klopfenstein, Columbus, OH (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 17/754,301

(22) PCT Filed: Jul. 7, 2020

(86) PCT No.: PCT/IB2020/056373
§ 371 (c)(1),
(2) Date: Mar. 29, 2022

(87) PCT Pub. No.: WO2021/064481
PCT Pub. Date: Apr. 8, 2021

(65) Prior Publication Data
US 2022/0341421 A1    Oct. 27, 2022

Related U.S. Application Data

(60) Provisional application No. 62/908,138, filed on Sep. 30, 2019.

(51) Int. Cl.
*F04C 14/26* (2006.01)
*A01C 23/00* (2006.01)
(Continued)

(52) U.S. Cl.
CPC ............. *F04C 14/26* (2013.01); *A01C 23/007* (2013.01); *F04B 49/24* (2013.01); *F04B 51/00* (2013.01);
(Continued)

(58) Field of Classification Search
CPC .................................................. F04C 2270/205
See application file for complete search history.

(56) References Cited

U.S. PATENT DOCUMENTS 2,612,777 A * 10/1952 Greer ................. F04D 15/0088
73/168
2,795,950 A * 6/1957 Liddell ................... G01F 25/13
73/168
(Continued)

FOREIGN PATENT DOCUMENTS

| CN | 101556181 A | 10/2009 | |
| CN | 102652510 | * 9/2012 | ............. A01M 7/00 |

(Continued)

OTHER PUBLICATIONS

CN102652510_machinetranslation; down loaded Oct. 25, 2023; Espacenet.com, 4 pages. (Year: 2025).*

(Continued)

*Primary Examiner* — Nathan C Zollinger
*Assistant Examiner* — Timothy P Solak

(57) ABSTRACT

A system (100) for testing an agricultural implement includes a frame (106) configured to receive a device (104) to be tested. The frame carries a filter (108), a pump (112), a pressure relief valve (116) in fluid communication with the pump outlet, a frame output tube (122) to deliver the flow of fluid from the pump outlet to the device to be tested, a frame return tube (124) to receive the flow of fluid from the device to be tested, and a recycle flow outlet (128). A method of testing includes connecting a device to the frame output tube (Continued)

and the frame return tube, pumping a fluid from the frame output tube to the frame return tube through the device, and measuring a flow rate of the fluid through the device.

7 Claims, 5 Drawing Sheets

(51) Int. Cl.
| | |
|---|---|
| *F04B 49/24* | (2006.01) |
| *F04B 51/00* | (2006.01) |
| *A01C 15/00* | (2006.01) |
| *A01C 21/00* | (2006.01) |
| *F04B 17/03* | (2006.01) |
| *F04B 23/02* | (2006.01) |
| *F04C 14/28* | (2006.01) |

(52) U.S. Cl.
CPC ............ *A01C 15/00* (2013.01); *A01C 21/005* (2013.01); *F04B 17/03* (2013.01); *F04B 23/02* (2013.01); *F04C 14/28* (2013.01)

(56) References Cited

U.S. PATENT DOCUMENTS

| | | | | | |
|---|---|---|---|---|---|
| 3,942,375 | A | * | 3/1976 | Shepherd | ............ F04D 15/0088 73/168 |
| 4,322,972 | A | * | 4/1982 | Karjala | ................. G01F 25/17 137/546 |
| 4,364,269 | A | * | 12/1982 | Kennerly | ................. G01F 3/38 73/223 |
| 5,856,929 | A | * | 1/1999 | McClendon | ............ F04B 51/00 702/50 |
| 6,318,167 | B1 | * | 11/2001 | Power | ................. F04B 51/00 73/37 |
| 7,810,362 | B2 | * | 10/2010 | Harwood | ................. D06F 33/42 68/12.23 |
| 2014/0320125 | A1 | * | 10/2014 | Leeb | ...................... G01R 21/08 324/252 |
| 2018/0263180 | A1 | | 9/2018 | Schlipf et al. | |
| 2019/0197793 | A1 | | 6/2019 | Russell et al. | |
| 2019/0246556 | A1 | | 8/2019 | Stoller et al. | |
| 2019/0254226 | A1 | | 8/2019 | Hodel et al. | |

FOREIGN PATENT DOCUMENTS

| | | | | |
|---|---|---|---|---|
| CN | 203083818 | U | 7/2013 | |
| CN | 203949714 | U | 11/2014 | |
| CN | 204330097 | U | 5/2015 | |
| CN | 205300835 | U | 6/2016 | |
| CN | 105973350 | A | 9/2016 | |
| CN | 106568484 | A | 4/2017 | |
| CN | 208383250 | * | 1/2019 | ............ G01F 25/00 |
| CN | 208383250 | U | 1/2019 | |
| CN | 209280099 | U | 8/2019 | |
| DE | 24 10 608 | A1 | 10/1975 | |
| KR | 20100090373 | A | 8/2010 | |
| KR | 20170117251 | A | 10/2017 | |

OTHER PUBLICATIONS

UK Intellectual Property Office, Search Report for related UK Application No. GB1915084.6, dated Apr. 21, 2020.

European Patent Office, International Search Report for related International Application No. PCT/IB2020/056373, mail date Sep. 14, 2020.

China National Intellectual Property Administration, Office Action for related CN Application No. 202080067084.4 dated Mar. 23, 2023, 9 pages.

\* cited by examiner

TEST FRAME AND METHODS FOR FLUIDLY TESTING AGRICULTURAL DEVICES

CROSS-REFERENCE TO RELATED APPLICATION

This application claims the benefit of the filing date of U.S. Provisional Patent Application 62/908,138, "Systems and Methods for Testing Agricultural Implements," filed Sep. 30, 2019.

FIELD

Embodiments of the present disclosure relate generally to test systems and methods for validating and calibrating agricultural equipment, such as planters, fertilizer applicators, etc.

BACKGROUND

Crop yields are affected by a variety of factors, such as seed placement, soil quality, weather, irrigation, and nutrient applications. Seeds are typically planted in trenches formed by discs or other mechanisms of a planter row unit.

Adding materials (such as fertilizers) adjacent to seed trenches during planting is a good way to deliver the materials to the soil for growing plants to access the material during a later growing stage. This eliminates a pass over the field to reduce compaction of the soil from separate planting and material application passes. Some of the fertilizer is placed adjacent to the seed trench, and when the plant grows and extends into the zone where the fertilizer was placed, the plant can then use the fertilizer.

There are various implements that deliver fertilizer to soil adjacent to the trench on a planter row unit. These implements generally have coulters or knives to open a space adjacent the trench and include a liquid delivery tube for delivering fertilizer. The amount of liquid is controlled to control the amount of fertilizer. Such implements are described in, for example, U.S. Patent Application Publication 2018/0263180, "Systems and Devices for Controlling and Monitoring Liquid Applications of Agricultural Fields," published Sep. 20, 2018; U.S. Patent Application Publication 2019/0254226, "Systems, Methods, and Apparatus for Agricultural Material Application," published Aug. 22, 2019; and U.S. Patent Application Publication 2019/0246556, "Implements and Application Units Having a Fluid Applicator with Nozzles for Placement of Applications with Respect to Agricultural Plants of Agricultural Fields," published Aug. 15, 2019.

BRIEF SUMMARY

In some embodiments, a system for testing an agricultural implement includes a frame configured to receive a device to be tested. The frame carries a filter, a pump having a pump inlet and a pump outlet, a pressure relief valve in fluid communication with the pump outlet, a frame output tube to deliver the flow of fluid from the pump outlet to the device to be tested, a frame return tube to receive the flow of fluid from the device to be tested, and a recycle flow outlet. Each of the pump, the filter, the pressure relief valve, the frame output tube, the frame return tube, and the recycle flow outlet are secured to the frame.

A method for testing an agricultural implement includes connecting a device to the frame output tube, connecting the device to the frame return tube, pumping a fluid from the frame output tube to the frame return tube through the device, and measuring a flow rate of the fluid through the device.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

and

Figure 5:
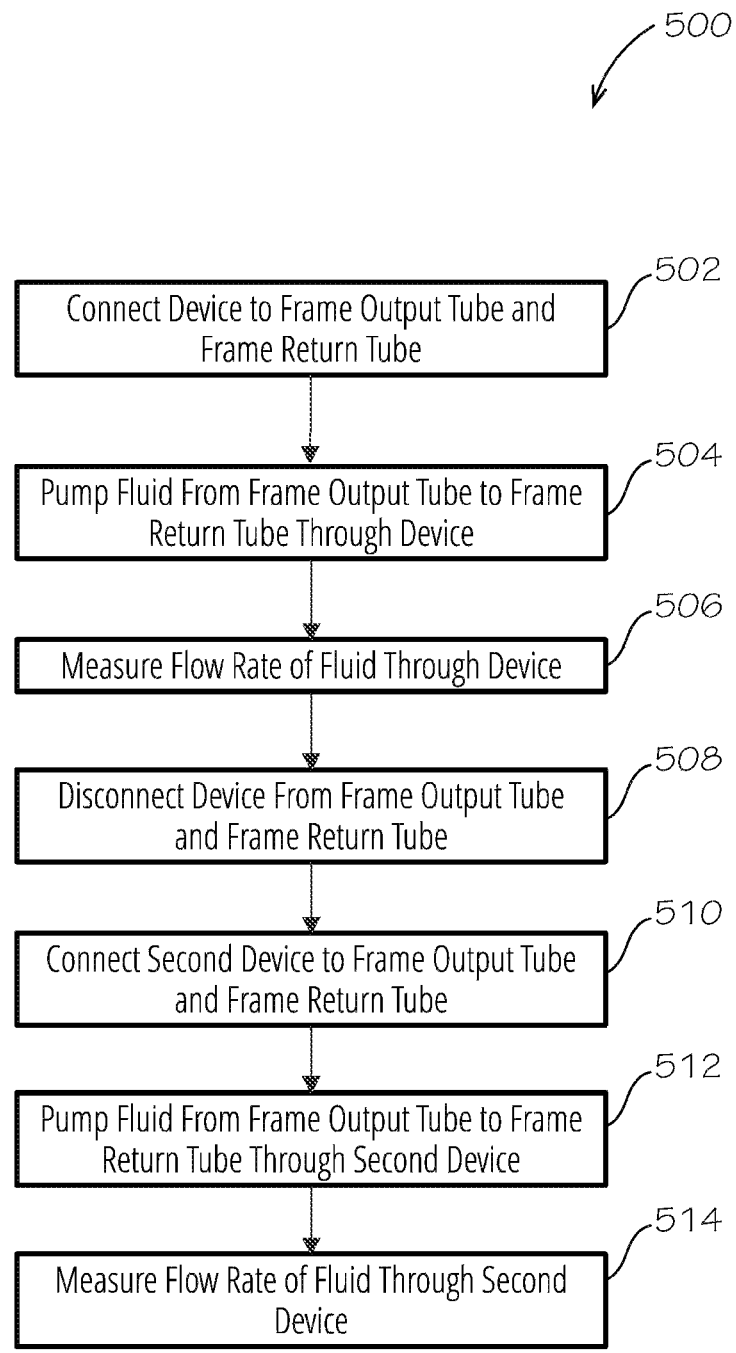

FIG. 5 is a simplified flow chart illustrating a method of testing an agricultural implement.

DETAILED DESCRIPTION

The illustrations presented herein are not actual views of any planter or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Figure 1:
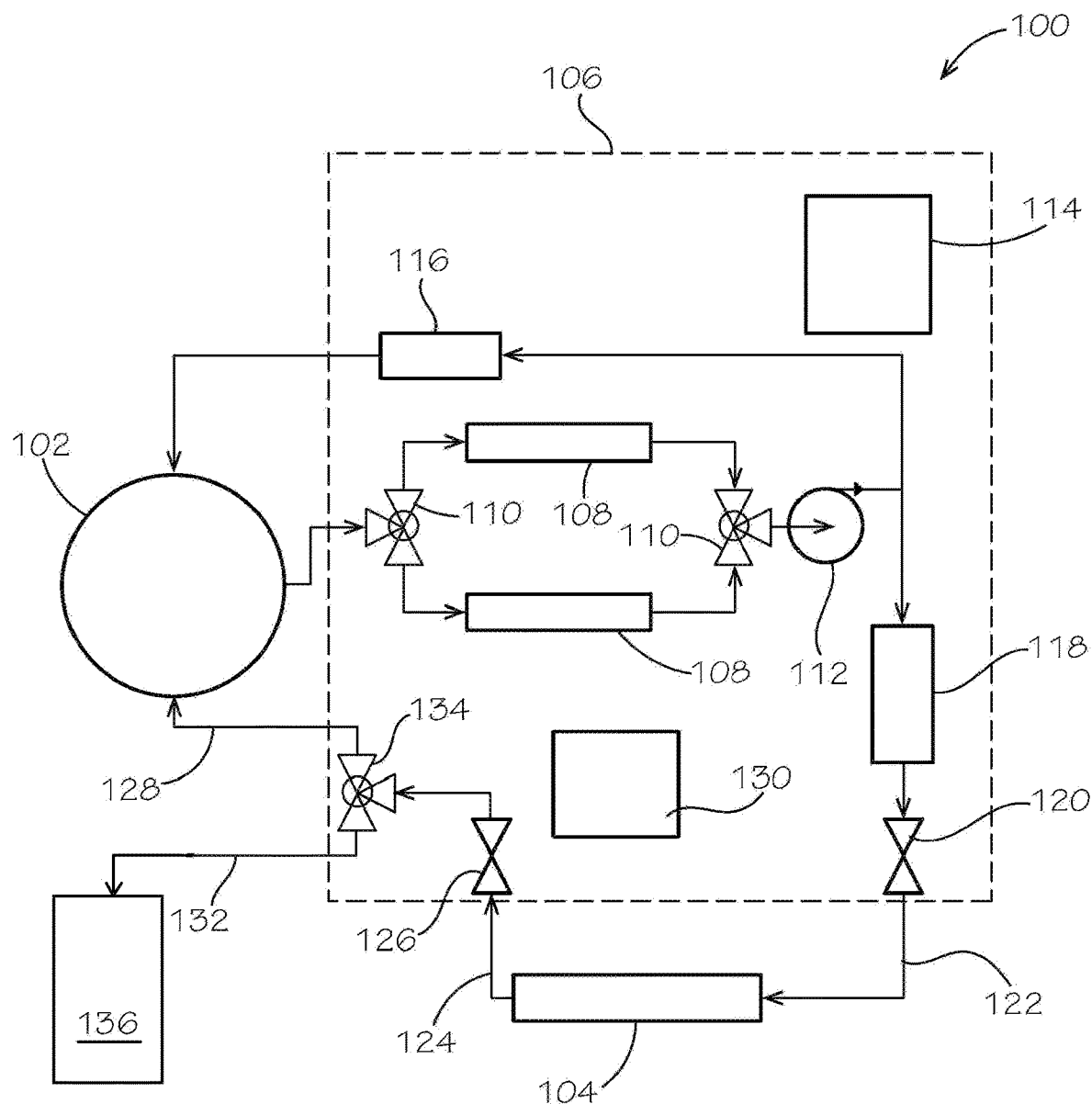
FIG. 1 is a simplified block flow diagram of a system for testing an agricultural implement.
Figure 2:
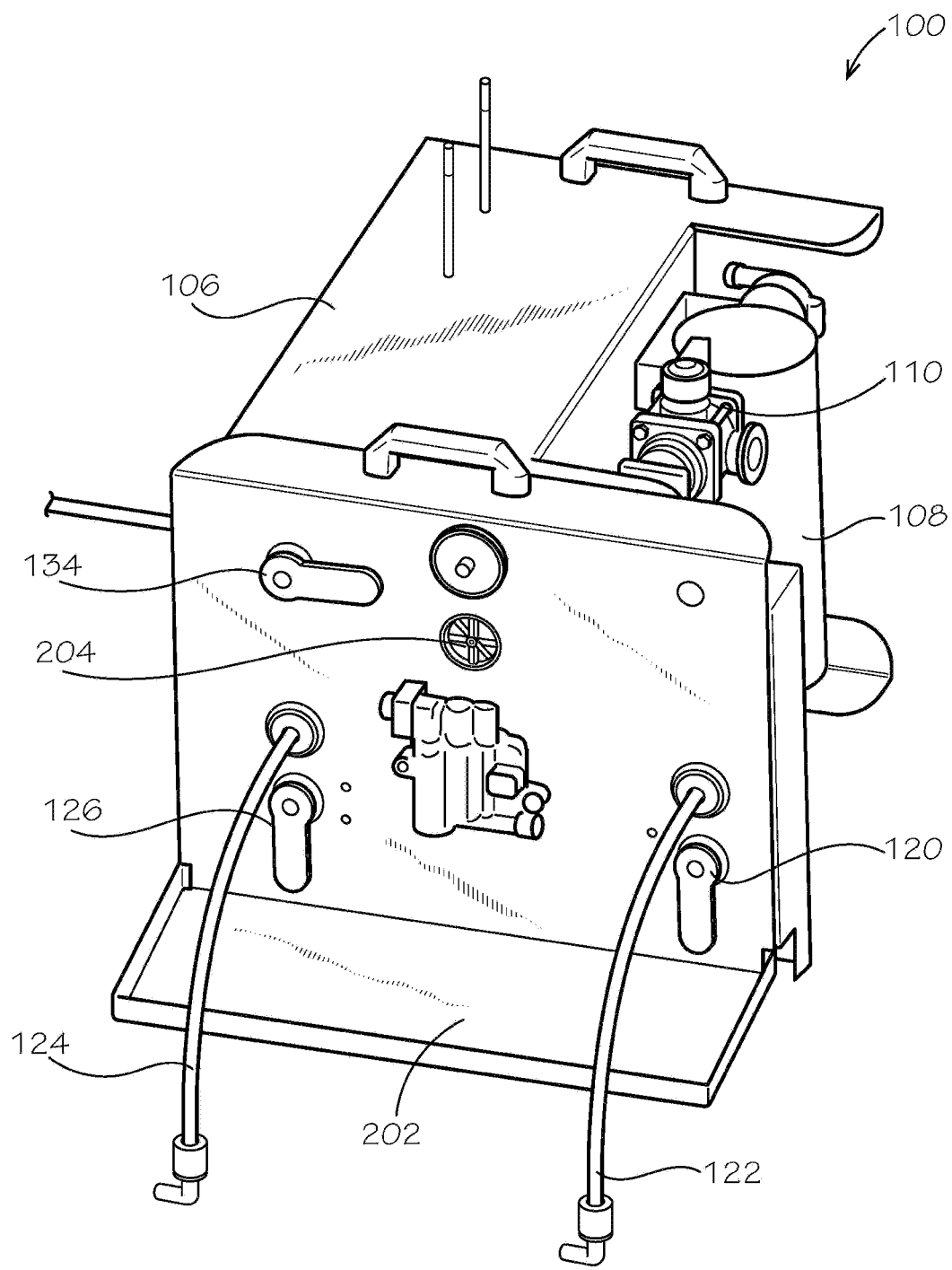
FIG. 2 is a simplified perspective view of the system illustrated in FIG. 1.
Figure 3:
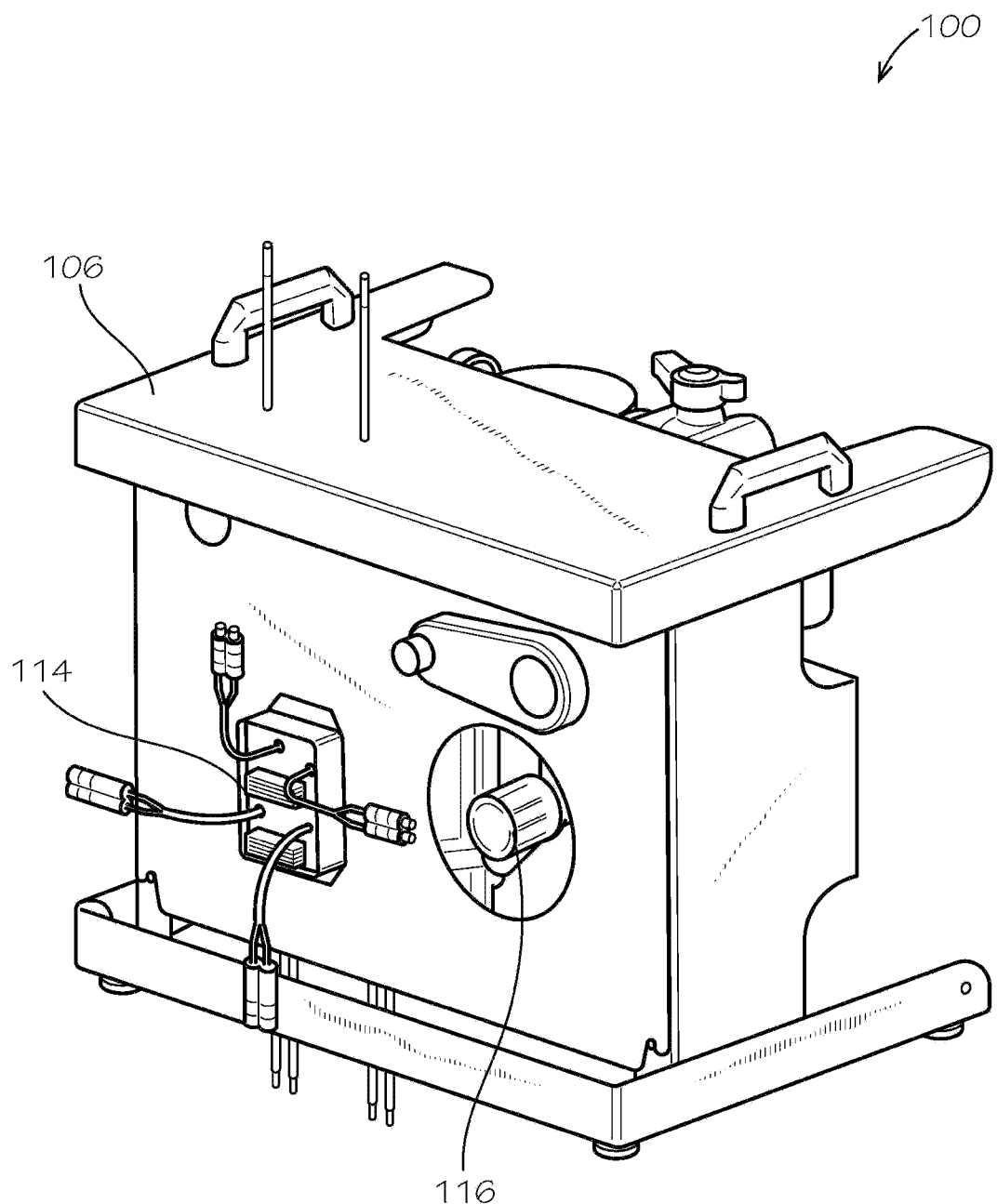
FIG. 3 is another simplified perspective view of the system illustrated in FIG. 1.
Figure 4:
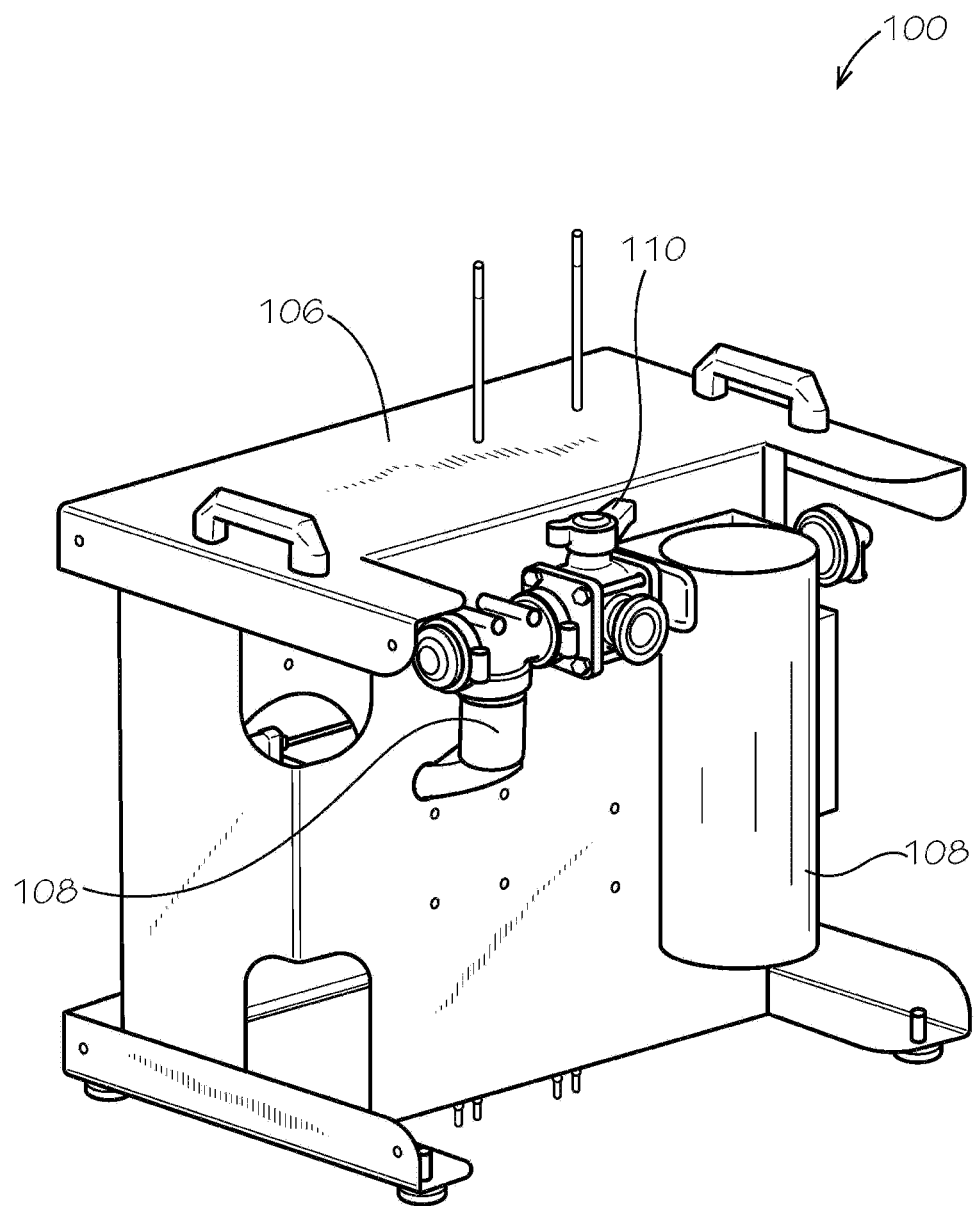
FIG. 4 is another simplified perspective view of the system illustrated in FIG. 1.

FIG. 1 is a simplified block flow diagram of a system 100 for testing, validating, or calibrating a portion of an agricultural implement, such as a liquid flow meter for a fertilizer applicator. In particular, the system 100 can be used in combination with a reservoir 102 (e.g., a 5-gallon bucket containing water) to test a device 104 (e.g., a flow meter). FIG. 2 through FIG. 4 show simplified perspective views of certain parts of the system 100, and illustrate how the system 100 may be constructed and packaged.

The system 100 includes a frame 106 containing components that may be used to test the device 104. Typically, the frame 106 is configured to receive the device 104, such as with hooks, a shelf or tray 202 (FIG. 2), etc., and fluid connections, discussed further below. The system 100 includes one or more filters 108. For example, and as shown in FIG. 1, the system 100 includes two filters 108 arranged in parallel. One or more valves 110 may be configured to direct flow to one filter 108 or the other. For example, one filter 108 may be configured to preferentially remove particles of one diameter, and the other filter 108 may be configured to preferentially remove particles of another diameter. In some embodiments, filters 108 may be arranged in series, such that flow passes through each filter 108.

The fluid is drawn through the filters 108 by a pump 112 having a pump inlet and a pump outlet, and may be controlled and/or powered by an electronics module 114. The fluid leaving the pump outlet may flow either through a pressure relief valve 116 and back to the reservoir 102, or toward the device 104. Typically, the pressure relief valve 116 may be set to permit a certain threshold pressure of fluid flowing through the device 104, and whenever the pressure provided by the pump 112 exceeds that threshold pressure, any excess fluid is diverted through the pressure relief valve 116. The pressure relief valve 116 may be adjustable, such that a user of the system 100 may adjust the pressure of fluid flowing through the device 104.

The system 100 may optionally include a flow meter 118. If present, the flow meter 118 may be configured to continuously or instantaneously measure the flow of fluid from the pump outlet (other than the portion, if any, flowing through the pressure relief valve 116). In some embodiments, the flow meter 118 may include multiple flow meters, such as an electronic flow meter and a visual flow indicator 204 (FIG. 2) (e.g., a spinning disk, a rotameter, etc.). The fluid flowing through the flow meter 118 travels through an output valve 120 to a frame output tube 122 leaving the frame 106. If the flow meter 118 is omitted, the fluid may flow from the pump 112 directly to the output valve 120. During a test, the frame output tube 122 connects to the device 104, and the fluid flows through the device 104 to a frame return tube 124 and back into the frame 106 via a return valve 126. The fluid then returns to the reservoir 102 via a recycle flow outlet 128, or, depending on the position of a calibration valve 134, to a waste flow outlet 132 or a container 136. Thus, the fluid in the reservoir 102 may be reused. Typically, the waste flow outlet 132 is used for a timed catch test to determine the volumetric flow rate of the fluid through the device 104, described below, but may be used any time the fluid is not to be recycled.

The frame 106 may, in some embodiments, carry a user interface 130 through which a user may interact with the system 100. The electronics module 114 may be configured to provide electrical power and/or data connections to the user interface 130, the pump 112, the flow meter 118, the device 104 being tested, or any other electrical components. The user interface 130 may provide information and/or controls related to the components of the system 100. For example, the user interface 130 may indicate the volumetric flow of fluid through the flow meter 118 and the pressure of the fluid in the flow meter 118. The user interface 130 may also allow a user to adjust the threshold pressure of the pressure relief valve 116, the speed of the pump 112, the position of the valves 110, etc. In some embodiments, the user interface 130 may receive information from the device 104, such as calculated flow and pressure, calibration parameters, etc. The user interface 130 may be configured to transmit information to the device 104, such as new calibration parameters. Information may be transferred between the user interface 130 and the device 104 via wireless communication or a wiring harness. In some embodiments, communication with the device 104 may be via a controller or other device associated with the agricultural implement on which the device 104 is installed. In certain embodiments, the user interface 130 may be omitted, and information related to the flow and pressure of the fluid may be transmitted by the electronics module 114 to an external device (e.g., a computer, a mobile telephone, an iPad, a tractor, etc.)

Each of the components shown in FIG. 1 and described above, with the exception of the device 104 and the reservoir 102, are typically secured to the frame 106, such that the system 100 may be easily transported from place to place. Thus, the system 100 may be used as a mobile testing system for agricultural implements. For example, the system 100 may be used to test devices that measure and control liquid flow, such as those described in U.S. Patent Application Publication 2018/0263180, "Systems and Devices for Controlling and Monitoring Liquid Applications of Agricultural Fields," published Sep. 20, 2018.

FIG. 5 is a simplified flow chart illustrating a method 500 in which the system 100 may be used for testing, calibrating, or validating an agricultural implement or a portion thereof.

In block 502, a device 104 is connected to the frame output tube 122 and to the frame return tube 124. Typically, the device 104 may be removed from the agricultural implement before testing, either physically or by simply disconnecting its fluid connections. The output valve 120 and the return valve 126 may be closed while connecting the device 104 so that the fluid being pumped by the pump 112 passes through the pressure relief valve 116, rather than through the output valve 120. Thus, the device 104 may be connected while the pump 112 is operating.

In block 504, fluid is pumped from the frame output tube 122 to the frame return tube 124 through the device 104 being tested (e.g., by opening the output valve 120 and the return valve 126). The flow rate of the fluid may be changed using the device 102 (if the device 102 includes a flow-control mechanism), adjusting the output valve 120, and/or adjusting the pressure relief valve 116.

In block 506, a flow rate of the fluid is measured, typically by measuring an electronic output from the device 104, using the flow meter 118, and/or by diverting fluid from the reservoir 102 to another container for a period of time. For example, a timed catch test may be performed by turning the calibration valve 134 and diverting the fluid flow from the recycle flow outlet 128 to another container 136 of known volume via the waste flow outlet 132. The time to fill that container may be measured (e.g., with a stopwatch or with a timer on the user interface 130), and a volumetric flow rate may be calculated by dividing the volume by the time. Various parameters of the device 104 may be tested while fluid is flowing through the device 104, such as pressure sensors, temperature sensors, operation of flow controls, or any other sensors or controls in the device 104.

In block 508, the device 104 is disconnected from the frame output tube 122 and the frame return tube 124 (e.g., by first closing the output valve 120 and the return valve 126).

The method 500 may also include testing additional devices. In block 510, a second device is connected to the frame output tube 122 and the frame return tube 124. In block 512, the fluid is pumped from the frame output tube 122 to the frame return tube 124 through the second device. In block 514, a flow rate of the fluid is measured. The second device may then be disconnected and reinstalled on an agricultural implement. Thus, multiple devices may be tested quickly using the system 100, without turning the pump 112 off and back on.

Additional non-limiting example embodiments of the disclosure are described below.

Embodiment 1: A system for testing an agricultural implement, the system comprising a frame configured to receive a device to be tested. The frame carries a filter, a pump having a pump inlet and a pump outlet, a pressure relief valve in fluid communication with the pump outlet, a frame output tube to deliver the flow of fluid from the pump outlet to the device to be tested, a frame return tube to receive the flow of fluid from the device to be tested, and a recycle flow outlet. Each of the pump, the filter, the pressure relief valve, the frame output tube, the frame return tube, and the recycle flow outlet are secured to the frame.

Embodiment 2: The system of Embodiment 1, further comprising a visual flow indicator secured to the frame and configured to measure the flow of fluid from the pump outlet to the device to be tested.

Embodiment 3: The system of Embodiment 1 or Embodiment 2, further comprising a flow meter secured to the frame and configured to measure the flow of fluid from the pump outlet to the device to be tested.

Embodiment 4: The system of any one of Embodiment 1 through Embodiment 3, further comprising a plurality of valves secured to the frame and accessible from an exterior of the frame.

Embodiment 5: The system of Embodiment 4, wherein the plurality of valves comprises a calibration valve configured to direct the flow of fluid through the recycle flow outlet when the calibration valve is in a first position and toward a waste flow outlet when the calibration valve is in a second position.

Embodiment 6: The system of Embodiment 4 or Embodiment 5, wherein the plurality of valves comprises an output valve and a return valve. When the output valve and the return valve are each in a first position, the device is in fluid communication with the flow meter and the waste flow outlet. When the output valve and the return valve are each in a second position, the flow meter is in fluid communication with waste flow outlet, and the device is fluidly isolated from the flow meter and the waste flow outlet.

Embodiment 7: A method for testing an agricultural implement, the method comprising providing the system of any one of Embodiment 1 through Embodiment 6, connecting a device to the frame output tube, connecting the device to the frame return tube, pumping a fluid from the frame output tube to the frame return tube through the device, and measuring a flow rate of the fluid through the device.

Embodiment 8: The method of Embodiment 7, wherein pumping a fluid comprises pumping fluid via the pump inlet from a reservoir external to the system and returning the fluid to the reservoir via the recycle flow outlet.

Embodiment 9: The method of Embodiment 7 or Embodiment 8, further comprising disconnecting the device from the frame output tube and the frame return tube, connecting a second device to the frame output tube and the frame return tube, pumping a fluid from the frame output tube to the frame return tube through the second device, and measuring a flow rate of the fluid through the second device.

Embodiment 10: The method of any one of Embodiment 7 through Embodiment 9, wherein measuring a flow rate of the fluid through the device comprises mearing a volume of fluid leaving the device in a period of time.

Embodiment 11: The method of any one of Embodiment 7 through Embodiment 10, wherein measuring a flow rate of the fluid through the device comprises measuring an electronic output from the device.

Embodiment 12: The method of any one of Embodiment 7 through Embodiment 11, further comprising controlling the flow rate of the fluid using the device.

Embodiment 13: The method of any one of Embodiment 7 through Embodiment 11, further comprising controlling the flow rate of the fluid by adjusting the pressure relief valve All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A method for testing a flow of fluid in an agricultural implement, the method comprising:
providing an agricultural flow meter;
providing a system comprising:
a frame carrying:
a filter;
a pump having a pump inlet and a pump outlet;
a pressure relief valve in fluid communication with the pump outlet;
a frame output tube to deliver a flow of fluid from the pump outlet to the agricultural flow meter, wherein the frame output tube has a first removable connection for connecting to the agricultural flow meter;
a frame return tube to receive the flow of fluid from the agricultural flow meter, wherein the frame return tube has a second removable connection for connecting to the agricultural flow meter;
a recycle flow outlet; and
a calibration valve operable between a first position and a second position, wherein the calibration valve in the first position is configured to direct the flow of fluid through the recycle flow outlet, and wherein the calibration valve in the second position is configured to direct the flow of fluid into a container of known volume;
wherein each of the pump, the filter, the pressure relief valve, the frame output tube, the frame return tube, the recycle flow outlet, and the calibration valve are secured to the frame;
connecting the agricultural flow meter to the frame output tube through the first removable connection;
connecting the agricultural flow meter to the frame return tube through the second removable connection;
pumping the fluid from the frame output tube to the frame return tube through the agricultural flow meter to fill the container of known volume;
measuring a time to fill the container;
calculating a flow rate of the fluid through the agricultural flow meter based on the known volume of the container and the time to fill the container;
disconnecting the agricultural flow meter from the first removable connection; and
disconnecting the agricultural flow meter from the second removable connection.

2. The method of claim 1, wherein pumping a fluid comprises pumping fluid via the pump inlet from a reservoir external to the system and returning the fluid to the reservoir via the recycle flow outlet.

3. The method of claim 1, further comprising:
providing a second agricultural flow meter;
connecting the second agricultural flow meter to the frame output tube through the first removable connection;
connecting the second agricultural flow meter to the frame return tube through the second removable connection;
pumping the fluid from the frame output tube to the frame return tube through the second agricultural flow meter; and
measuring a flow rate of the fluid through the second agricultural flow meter.

4. The method of claim 1, wherein measuring the flow rate of the fluid through the agricultural flow meter comprises measuring a volume of fluid leaving the agricultural flow meter in a period of time.

5. The method of claim 1, wherein measuring the flow rate of the fluid through the agricultural flow meter comprises measuring an electronic output from the agricultural flow meter.

6. The method of claim 1, further comprising controlling the flow rate of the fluid using the agricultural flow meter.

7. The method of claim 1, further comprising controlling the flow rate of the fluid by adjusting the pressure relief valve.

* * * * *